(12) United States Patent
Behrendt et al.

(10) Patent No.: US 8,762,539 B2
(45) Date of Patent: *Jun. 24, 2014

(54) SEMANTIC- AND PREFERENCE-BASED PLANNING OF CLOUD SERVICE TEMPLATES

(71) Applicant: International Business Machines Corporation, Armonk, NY (US)

(72) Inventors: Michael Behrendt, Boeblingen (DE); Benjamin Blau, Karlsruhe (DE); Gerd Breiter, Boeblingen (DE); Steffen Haak, Karlsruhe (DE); Rudi Studer, Karlsruhe (DE); Clemens van Dinther, Karlsruhe (DE); Christof Weinhardt, Karlsruhe (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/693,154

(22) Filed: Dec. 4, 2012

(65) Prior Publication Data

US 2013/0073735 A1 Mar. 21, 2013

Related U.S. Application Data

(63) Continuation of application No. 13/271,575, filed on Oct. 12, 2011.

(30) Foreign Application Priority Data

Nov. 26, 2010 (EP) .................................... 10192747

(51) Int. Cl.
*G06F 15/173* (2006.01)

(52) U.S. Cl.
USPC ............ 709/226; 709/223; 718/104; 718/105

(58) Field of Classification Search
USPC .................................. 709/221, 226; 718/104
See application file for complete search history.

(56) References Cited

U.S. PATENT DOCUMENTS

| 7,035,930 B2 | 4/2006 | Graupner et al. |
| 8,020,034 B1 * | 9/2011 | Shrivastava et al. ......... 714/4.11 |

(Continued)

FOREIGN PATENT DOCUMENTS

| CN | 101329629 | 12/2008 |
| CN | 101383854 | 3/2009 |

OTHER PUBLICATIONS

"VMware Infrastructure Architecture Overview", 2006, [online] VMware white paper, [retrieved on Jul. 25, 2013]. Retrieved from the Internet: <URL:http://www.vmware.com/pdf/vi_architecture_wp.pdf>.*

(Continued)

*Primary Examiner* — Jeffery Williams
*Assistant Examiner* — Zhimei Zhu
(74) *Attorney, Agent, or Firm* — Francis Lammas; Stephen J. Walder, Jr.; Yeen C. Tham (57) ABSTRACT

A mechanism is provided for evaluating a service based on a request for the service. At least one attribute, having at least one preference parameter, is assigned to at least one generic configuration, the at least one generic configuration comprising at least one resource. A request is received for the service having an assigned quality-of-service-value, and a respective preference parameter value is assigned to each of the at least one preference parameters based on the quality-of-service-value. Furthermore, a combination of the resources is selected based on the request, the combination of the resources forming a selected configuration. Additionally, the selected, configuration is mapped to one of the at least one of the generic configurations and the at least one preference parameter of the at least one attributes of the mapped at least one of the generic configurations is mapped to the selected, configuration.

8 Claims, 5 Drawing Sheets

(56) References Cited

U.S. PATENT DOCUMENTS

| | | | |
|---|---|---|---|
| 8,046,477 B1* | 10/2011 | Arutla et al. | 709/229 |
| 8,438,573 B2* | 5/2013 | Gusev et al. | 718/104 |
| 2002/0120744 A1* | 8/2002 | Chellis et al. | 709/226 |
| 2005/0138187 A1* | 6/2005 | Breiter et al. | 709/229 |
| 2006/0047813 A1* | 3/2006 | Aggarwal et al. | 709/226 |
| 2007/0016897 A1 | 1/2007 | Todd | |
| 2008/0320460 A1* | 12/2008 | Miller et al. | 717/162 |
| 2010/0115511 A1* | 5/2010 | Kang et al. | 718/1 |
| 2011/0179170 A1* | 7/2011 | Gusev et al. | 709/226 |
| 2012/0137005 A1 | 5/2012 | Behrendt et al. | |

OTHER PUBLICATIONS

Al-Ali, R., et al. "An OGSA-based quality of service framework." 2004, In Grid and Cooperative Computing (pp. 529-540). Springer Berlin Heidelberg.*

Chu et al., "Partners Selection for Virtual Enterprises", Jun. 28-Jul. 2, 2000, Proceedings of the 3" World Congress on Intelligent Control and Automation, pp. 164-168.*

White, J.; Schmidt, D.C., "Automating deployment planning with an aspect weaver," Jun. 2009, Software, IET, vol. 3, No. 3, pp. 167-183.*

Afgan, E. et al., "Grid Resource Broker Using Application Benchmarking", Advances in Grid Computing—EGC 2005 Lecture Notes in Computer Science vol. 3470, 2005, pp. 691-701.*

Marco Comuzzi and Barbara Pernici. 2009. "A framework for QoS-based Web service contracting". ACM Transactions on the Web, vol. 3, No. 3, Article No. 10 (Jul. 2009), 52 pages.*

David Martin et al., "Bringing Semantics to Web Services with OWL-S", Sep. 2007, World Wide Web, vol. 10, Issue 3, pp. 243-277.*

Sergio Andreozzi et al., "Towards a Metamodeling Based Method for Representing and Selecting Grid Services", 2004, Grid Services Engineering and Management, Lecture Notes in Computer Science, vol. 3270, pp. 78-93.*

USPTO U.S. Appl. No. 13/271,575.

"KAON2", http://kaon2.semanticweb.org/, printed Aug. 3, 2011, 7 pages.

"Web Ontology Language (OWL)", http://www.w3.org/2004/OWL/, printed Aug. 3, 2011, 3 pages.

Horrocks, Ian et al., "SWRL: A Semantic Web Rule Language Combining OWL and RuleML", http://www.w3.org/Submission/SWRL/Overview.html, printed Aug. 3, 2011, 33 pages.

* cited by examiner

SEMANTIC- AND PREFERENCE-BASED PLANNING OF CLOUD SERVICE TEMPLATES

BACKGROUND

The invention relates generally to a method and an engine for evaluating a service based on a request for a service, in particular an information technology service. The information technology service may in particular be dedicated to a Cloud Computing environment. The invention relates further to a service evaluation engine, a computer system, data processing program, and a computer program product.

In the current days of Cloud Computing, i.e., consuming information technology services (IT-service) as a service, either from a Public Cloud Computing environment or from a Private Cloud Computing environment, it is required to manage virtual machines, configurations and infrastructures in a most efficient and dynamic way. In this context, a Private Cloud Computing environment may be viewed as applying the rules of a Public Cloud Computing environment and apply it to enterprise data centers. Cloud services may be defined, as shared services under a virtualized management, being accessible over the Internet by people or other services via Internet standards.

A creation of dynamic IT-service templates is a central task in modern data centers to allow data center customers requesting IT services based on these service templates. Templates may be seen as generic predefined cook-book-like definitions of classes of resources that may not be specified on the most detailed level possible, but on a generic level adhering to classes of resources.

Thereby, a multitude of different service components may lead to a vast set of possible configurations, each of them contributing to various quality-of-service aspects, e.g., performance, availability, security, price, etc.

An automatic management or only a comprehensible management of required quality-of-service aspects may hardly be automated and may require often expert knowledge of an experienced data center employee. This may make an automatic management of IT-services, particularly in Cloud Computing environments, hardly achievable.

Several approaches have been followed in order to improve drawbacks of automatic or semi-automatic resource configuration in IT environments. One approach has been disclosed in CN11383854. A method for providing WebServices based on a user preference is disclosed. The method comprises the following steps: establishing a WebService composition template library which at least comprises a WebService composition template profile as well as a list and a process for abstract services, which are all described by an ontology concept in an ontology library; ensuring the preference degree of a user to the ontology concept; and searching a WebService composition template which is matched with a WebService request according to the WebService request of the user.

Today's rule-based validation systems may evaluate each possible configuration of dynamic IT-service templates to either "valid" or "invalid" instead of being based on preference degrees. There may only be a volume but no value business support, meaning that masses of configurations may be validated in terms of technical validation and functionality but not in terms of business requirements.

Additionally, these systems may not include abstraction levels like, e.g., a class named "Linux" abstracting from the various Linux distributions. That is, for each possible configuration instance there has to be an individual rule. With a growing number of different resources this may be an unmanageable approach.

Neither do the existing systems have the possibility to infer quality-of-service aspects, based on known patterns of atomic entities, nor do they allow higher level class relationships.

Typically, the set of rules may closely be intertwined with program code of generation tools that may be used for generating the rules and, therefore, hard to maintain and evolve.

However, because of the above-mentioned drawbacks and available technology, there may be a need, for a flexible and dynamic evaluation of services, particularly IT-services relating to quality-of-service (QoS) aspects of a request for an IT-service. It may also be advantageous having a mechanism for an automatic selection of resources relating to QoS requirements if several options to fulfill a request may be available.

SUMMARY

The need for a flexible and dynamic evaluation of services, particularly IT-services relating to quality-of-service (QoS) aspects of a request for an IT-service may be addressed by a method for validating a service based on a request as well as to a service evaluation engine according to the independent claims.

According to one embodiment, a method for evaluating a service, in particular an information technology service based on a request for the service may be provided. The method may comprise assigning at least one attribute, having at least one preference parameter, to at least one generic configuration, wherein the at least one generic configuration comprises at least one resource, receiving a request for the service having an assigned quality-of-service-value, and assigning a respective preference parameter value to each of the at least one preference parameters based on the quality-of-service-value.

The method may also comprise selecting a combination of the resources based on the request, wherein the combination of the resources may form a selected configuration, as well as mapping the selected configuration to one of the at least one of the generic configurations and mapping the at least one preference parameter of the at least one attributes of the mapped at least one of the generic configurations to the selected configuration, and validating the selected configuration based on ontology rules related to the plurality of resources. Finally, the method may comprise calculating a satisfaction degree for the validated configuration based on the preference parameter value. The calculation may also be performed by the reasoner. The calculating may also be based on the ontology rules.

In another embodiment a service evaluation engine for evaluating a service based on a request for the service may be provided. The service evaluation engine may comprise an assigning unit adapted for assigning at least one attribute, having at least one preference parameter, to at least one generic configuration, wherein the at least one generic configuration comprises at least one resource, as well as a receiving unit adapted for receiving a request for the service having an assigned quality-of-service-value and an assigning unit. The assigning unit may be adapted for assigning a respective preference parameter value to each of the at least one preference parameters based on the quality-of-service-value.

Furthermore, the service validation may comprise a selecting unit adapted for selecting a combination of the resources based on the request, wherein the combination of the resources may form a selected configuration, and a reasoner adapted for mapping the selected configuration to one of the at least one of the generic configurations and mapping the at least one preference parameter of the at least one attributes of the mapped at least one of the generic configurations to the selected configuration. The reasoner may also be adapted for validating the selected configuration based on ontology rules related to the plurality of resources. Additionally, the engine may comprise a calculating unit, in particular the reasoner adapted for calculating a satisfaction degree for the validated configuration based on the preference parameter value, and in particular based on the ontology rules.

BRIEF DESCRIPTION OF THE SEVERAL VIEWS OF THE DRAWINGS

Preferred embodiments of the invention will now be described, by way of example only, and with reference to the following drawings.

DETAILED DESCRIPTION

It should be noted that the request may be based on a user requirement. The request may be formulated using a structured or a natural language.

An attribute of a resource may have the quality of assigning a quality aspect to a resource, e.g., performance, price, availability, environmental compliance/CO2 costs, etc. for the resource. Each of the attributes may have assigned preference parameters. As an example, the preference parameters may be, e.g., high, medium, and low. It may be noted that all three preference parameters may exist in parallel and not alternatively. In this case, "high, medium, and low" are not parameter values, but parameters to which values may be assigned to.

A quality-of-service-value may be provided in a natural language form. In particular, a series of quality-of-service-values may be linked to a request.

It may also be noted that the selecting a combination of the resources based on the request may include only one resource depending on the request. The combination may be selected by a user, such that the combination has a relatively high probability of satisfying the request with the QoS-value as desired.

The mapping may be performed by a reasoner, such that a best mapping between the generic configurations and the selected configuration may be achieved taking into account the preference parameters.

Furthermore, there may be understood that an ontology may define objects and relations between the objects. Transformed to the current method, the ontology may define resources and relationships between the resources. The ontology may also define rules between different resources or combination of resources.

Moreover, it may be understood that the validating—by a reasoner—may be a technical validation, meaning a check whether a selected configuration may be functional from the technology point of view.

In the context of this application, the following principle terms may be used:

Service—The term service may denote a technical service, in particular an IT-service. A service in this sense may be provisioning of a virtual machine from, e.g., a Cloud. Computing provider. Another example may be a provisioning of a specific application service, e.g., a transactional system like a travel expense software program being delivered over the Internet and being accessible by a browser. Again alternatively, an IT-service may also be a provisioning of a development platform including development tools. Generally, a service may be understood as any service that may be delivered in an information technology environment. It may be based on well accepted standards like, e.g., WebServices standards as defined by W3C, namely the World Wide Web Consortium. However, any other standard, may also be used.

Configuration—A configuration may denote a combination of resources of data center components. A configuration may be a generic configuration, i.e., a configuration that may not be specified till the last detail, but may work on classes of resources. For example, Linux may be specified as an operating system. However, in a generic configuration, only Linux may be specified, but not exact distribution details like the vendor providing a specific Linux system as well as a version number and/or release number. In this sense, a generic configuration may also be seen as abstract or incomplete.

A specific configuration may be a detailed configuration that may specify a complete set of parameters including version numbers and release levels. A generic configuration may be, e.g., an x86 system with a Windows operating system and a relational database. In contrast thereto, a specific configuration may—as an example—be directed to a server from the computer maker Lenovo, with a defined system number, a Windows XP operating system with service pack 3 and a database from IBM, namely DB2, version 9.7.

Request—A request may denote an order for a dedicated service, in particular being delivered over the Internet in, e.g., a Cloud Computing environment. The request may be defined in a natural language or in a structured way, i.e., similar to a programming language, e.g., in XML (extended. Markup Language). Any other specification language may be used. A request may also include a certain quality criteria, e.g., a specific price point or an availability level, e.g., 99.5%.

Attribute—An attribute of a resource may denote any characteristic of a resource. Examples may be performance, price, availability, or environmental compliance criteria, like CO2 costs or an energy consumption level. Attributes may have assigned parameters, particularly preference parameters assigned, to them. One example may be the preference parameters "high", "medium" and "low".

Preference parameter—The term "preference parameter" may denote a field of placeholders for real values to be assigned to them. Another example for power consumption may be 300 W, 500 W, 800 W and 1300 W, or any other values.

Quality-of-service-value—The term "quality-of-service-value", in short "QoS-value", may denote a value or a plurality of values relating to a request. For example, a request may be formed as "please deliver computing capacities in form of an x86-based system requiring not more power than 1 kW with an availability of 99.8%. The computing capacities may be accessible via a Red Hat Linux operating system.

Resources—The term "resources" may denote any typical resource accessible in a data center like computing systems, networks, hard disks, storage systems, software of any form, etc. A larger group of IT resources may be pooled together in a data center of an IT service provider, e.g., a Public Cloud Computing provider. Alternatively, the pool of resources may be available in data centers applying Cloud Computing standards in a Private Cloud Computing environment.

Mapping a configuration—This term may denote finding a best fit between different configurations, e.g., a generic configuration and a selected user-defined configuration. Because the selected configuration may have many more details than the available generic configurations, a series of rules may need to be taken into account. A computer-based reasoner may be a good tool to support such an automatic process. A matching of the configurations may be optimized according to various rules and optimization criteria.

Validating a configuration—This terra may denote a technical specification test whether a set of specifications of a combination of resources would be able to work together. Certain combinations or configurations may technically not work at all. A skilled person may understand that a database called mySQL may not be specified for a zOS operating system. The two resources may simply be incompatible. Thus, a validation of a configuration may denote a test against a set of rules whether the combination of resources would make technical sense, i.e., the question may be answered "would this configuration be functional?"

Satisfaction degree—The term "satisfaction degree" may denote a number expressing an overall factor as to how a configuration may fit to a request, given that the request also may have specified a series of preferences or preference parameters. For example, one satisfaction degree may be 0.8 for one selected configuration while for another selected configuration the satisfaction degree may be 0.58. A simple number may allow easy comparison of satisfaction degrees.

The above-described method for controlling an asset management system may provide a couple of advantages. In particular, the method may solve the problems stated above. The method may be based on three pillars: There may be used an OWL-based (Web Ontology Language, a specification of the W3C) description for specific service resources. There may be provided a validation and rule-based recognition of QoS aspects. And by the method, there may be provided a preference-based selection through a computation of a satisfiability or satisfaction degree.

Instead of merely validating a service, a total value of a complex service construct may be calculated through the usage of utility functions representing a customer's preference expressed in a request.

Through the vast modeling capabilities of OWL, including class inheritance and class property, restriction abstraction levels of resources may be managed. It may no longer be required to have one single, dedicated, individual rule for each possible configuration of the pool of resources. This may solve the problem of a non-existence of validation systems without abstraction levels.

Next, the feet that existing validation systems may not have the possibility to infer QoS aspects based on known patterns of atomic entities or higher level, class relations between resource classes may be addressed by the circumstance that QoS attributes may not have to be stated explicitly. Through the usage of rules, certain attributes may be inferred automatically from a requested service structure. For example, the total costs of a configuration may be classified based on an occurrence of certain service components, i.e. certain resources. A rule may recognize "low costs" service if it may contain only software instances of the class "open source software".

Also, the strong relationship between a generation tool for services and the problem of difficult maintenance and evolution of configurations in the state-of-the-art tools may be overcome. Through the option of a usage of standardized and widely accepted description language like OWL, the strong link may be broken. This may mean a decoupling of a domain's, i.e., resource description and its rules sets from a programming code. This may particularly be advantageous for an easy interchangeability of domain ontology files. That is, a move to another IT-service provider may be possible without redefining all dependencies. An abstract ontology level may enable a quick move to another service provider with a different resource set.

According to one embodiment of the method, the selecting the combination of resources may comprise selecting a second combination of resources forming a second selected configuration. In particular, also a third and a forth selected configuration may be specified. Actually, any number of configurations may be specified or selected. Thus, at least two different selected, configurations potentially having different attributes and different preference parameters may exist. The fit to the request for an IT-service and the related QoS-value, or QoS-values, respectively, may be different. The calculating of a satisfaction degree for each selected configuration may ease a decision for a specific configuration to be used by a requestor of the service.

In another preferred embodiment of the method, the calculation of a satisfaction degree may comprise selecting the selected configuration having the highest satisfaction degree. This may allow choosing that configuration which may have the best compromise in terms of potentially conflicting preference parameters to be derived from the service request. Even if two different selected configurations may technically be valid, the request may be satisfied with different infrastructure components. One may, e.g., be better regarding environmental conflicts. That is, may require less electrical power. If a request for a service may have been combined with a QoS-value directed to a configuration having a minimum of power usage, the satisfaction degree calculation may show a higher satisfaction degree for the configuration requiring just little power. The example given may be equivalent for other attributes and preferred parameters.

In another embodiment of the method, the selecting the combination of resources may comprise providing a view of the plurality of resources in a user interface and providing a selection tool for selecting the resources. In particular, the view may be a structured view, e.g., a tree view. The plurality of resources may in particular be all or selected infrastructure components of a service provider, particularly a plurality of IT resources. Examples may be computer systems of all sorts, network and storage components, as well as software programs. Once the resources have been displayed to a user or administrator, he/she may select dedicated resources or resource components using a graphical user interface. By providing a structured view, e.g., a tree view, an administrator may choose specific resources that may build a configuration for satisfying the request for resources. A graphical user interface may particularly be helpful for an interaction with a user.

In just another embodiment of the method, the assigning the respective preference parameter value may comprise providing a view of the at least one preference parameter and providing a user interface for receiving the respective preference parameter value. As discussed in the previous paragraph, the user interface may also be adapted for receiving input values allowing an identification of selected resources.

In an advanced embodiment of the method, the configuration may be described in two ontology layers. One of the ontology layers may be a generic service ontology. As known by a skilled person, ontology may describe objects and relationships between the objects. In this case, the objects may be the resources. The advantage of having two layers may be in having the option to separate a generic or abstract layer and a detailed, physical layer. A lower layer of the ontology may then describe dedicated resources including all specifications. A third ontology layer may also be provided. This third layer may be positioned, between the generic layer and a concrete physical resources describing layer, such that a "semi-abstract" layer may relate to classes of resources, e.g., operating systems, RISC computer systems, relational databases, etc. This three-layering may also allow moving the semi-abstract ontology description to another service provider having potentially a different set of concrete, physical resources. However, because of the generic form of the upper layer of the ontology, it may be possible to map easily concrete, dedicated resource components of another data center to the generic description of the ontology.

In another advanced embodiment of the method, the two ontology layers may be based on the Web Ontology Language, in particular OWL from W3C. The standardization may have the advantage of an easy portability to another provider with other data center resources.

In one of the embodiments of the method, the rules of the ontology are based on the Semantic Web Rule Language. This may have the advantage of a standardized way of expressing the ontology rules for an easy exchangeability between different providers of resources. SWRL may be tightly related to OWL from W3C as a skilled person may know. SWRL may be seen as a proposal for a Semantic Web Rule Language based on a combination of the OWL-DL (OWL Data Language) and OWL Lite sublanguages of the OWL Web Ontology Language with the Unary/Binary Datalog RuleML sublanguages of the Rule Markup Language. SWRL may include a high-level abstract syntax for Horn-like rules in both, the OWL-DL and OWL Lite sublanguages of OWL. A model-theoretic semantics may be given providing a formal meaning for OWL ontologies including rules written in this abstract syntax. An XML syntax may be based on RuleML (Rule Markup Language) and the OWL XML Presentation Syntax.

In embodiment of the method, the calculating of a satisfaction degree is based on a weighted aggregation of all attributes, and in particular on their respective preference parameters. As mentioned earlier, a result with a single value may ease a selection process if several configurations may be used to satisfy a request. However, if the QoS-value may not be met at 100%, an alternative with a lower degree of satisfaction may be needed. The calculation as discussed, may be based on a mathematical model, e.g., on the Multi-Attribute Utility Theory (MAUT). The related weights may be input via a user interface. The user interface may be integrated with the graphical user interface for inputting the preference parameter value. However, it may alternatively be an independent user interface.

In one embodiment of the service evaluation engine, the service evaluation engine may be based on the Eclipse Rich Client Platform (RCP), the Eclipse Modeling Framework (EMF) and the Graphical Modeling Framework (GMF). While the Eclipse platform may be designed to serve as an open tools platform, it may be architected so that its components may be used to build just about any client application. The minimal set of plug-ins needed to build a rich client application may collectively be known as the Rich Client Platform. By using a standard-based tool, a requirement of redefining already existing technologies may be avoided. It may also be helpful as a means for a faster acceptance and adoption in Cloud Computing environments. No additional learning in order to work with the toolset may be required.

In another advanced embodiment of the service evaluation engine, the reasoner may be the KOAN2 reasoner. KAON2 may be an infrastructure for managing OWL-DL, SWRL, and F-Logic ontologies. It was produced by the joint effort of the following institutions: The Information Process Engineering (IPE) at the Research Center for Information Technologies (FZI), the Institute of Applied Informatics and Formal Description Methods (AIFB) at the University of Karlsruhe and the Information Management Group (IMG) at the University of Manchester.

KAON2 may be a successor to the KAON project (often referred to as KAON1). The main difference to KAON1 may be the supported ontology language. KAON1 used a proprietary extension of RDFS, whereas KAON2 is based on OWL-DL and F-Logic.

KOAN2 may implement the following features: An application programming language (API) for programmatic management of OWL-DL, SWRL, and F-Logic ontologies, a stand-alone server providing access to ontologies in a distributed manner using RMI (remote method invocation), an inference engine for answering conjunctive queries (expressed using SPARQL syntax), a DIG interface, allowing access from tools such as Protege, and a module for extracting ontology instances from relational databases.

It may be noted that embodiments may take the form of an entire hardware implementation, an entire software embodiment or an embodiment containing both, hardware and software elements. In a preferred embodiment, the invention may be implemented in software which includes, but is not limited to, firmware, resident software and microcode.

In one embodiment, a data processing program for execution in a data processing system may be provided comprising software code portions for performing the method, as described above, when the program is run on a data processing system. The data processing system may be a computer or computer system attached to the asset management system via communication means.

Furthermore, embodiments may take the form of a computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

It should also be noted that embodiments of the invention have been described with reference to different subject-matters. In particular, some embodiments have been described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

In the following, a detailed description of the drawings will be given. All illustrations in the drawings may be schematic. Firstly, a block diagram of the method for evaluating a service will be described. Afterwards, several method components and related elements, as well as the service evaluation engine, will be described.

Figure 1:
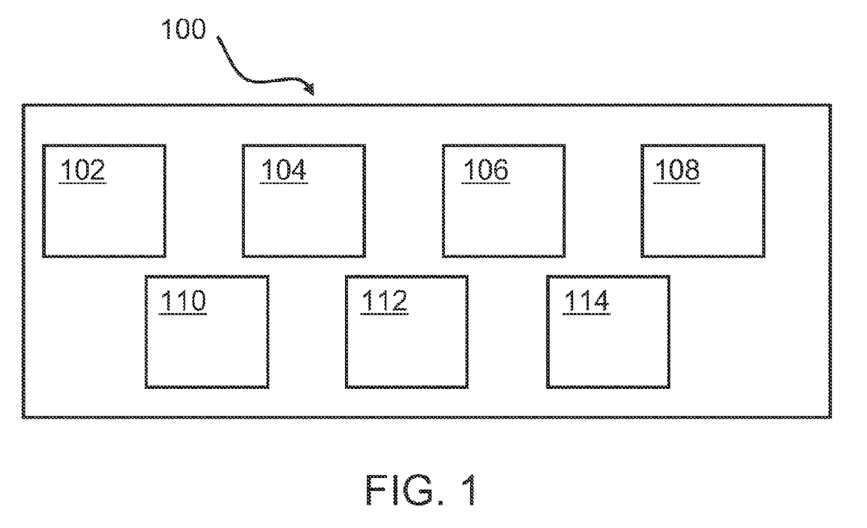
FIG. 1 may show an embodiment of the inventive method of evaluating a service.

FIG. 1 may show an example of the method 100 for evaluating a service, particularly an information technology service based on a request for a service. The request may originate from a user requiring the service. The method may comprise assigning, 102, at least one attribute to at least one generic configuration, wherein the at least one generic configuration comprises at least one resource. Examples of attributes may particularly comprise performance, price, availability, environmental compliance/power consumption, etc. Basically everything that may characterize a resource in a data center may be used as an attribute. Each attribute may have at least one preference parameter. However, each attribute may have several preference parameters. Examples may be high, medium and low as already discussed above. The generic configuration may have been discussed earlier already. Other preference parameters may be used instead.

The method may also comprise receiving, 104, a request for the service having an assigned quality-of-service-value. The request may be received in a standardized form or in an unstructured way. In particular, the QoS-value may be a series of different values. For example, it may be requested to have a computing resource running, e.g., a Windows operating system having an availability of e.g., 99.2%.

Furthermore, the method may comprise assigning, 106, a respective preference parameter value to each of the at least one preference parameters based on the QoS-value. This may be achieved by using a graphical user interface for a user or administrator allowing to select specific values or type the values directly into an input window. Some of the preference parameters may be predefined as part of the rules of the ontology. For example, a mainframe computer, as a resource, may have a high value for power consumption as well as a relatively high availability value. The availability of a Windows operating system running on an x86 architecture system may have a lower availability value. A preference parameter "price" may be defined as relatively low for a Linux operating system.

Moreover, the method may comprise selecting, 108, a combination of the resources based on the request. This may again be achieved, by a graphical user interface. A combination of resources may also include only one resource. The selecting may be done in a way that there is a predefined probability for being able to fulfill the request with its related QoS-value. The combination of the resources may then form a selected configuration.

Additionally, the method may comprise mapping, 110, the selected configuration to one of the at least one of the generic configurations and mapping the at least one preference parameter of the at least one attributes of the mapped, at least one of the generic configurations to the selected configuration. The mapping may be done by a reasoner, particularly the KOAN2 reasoner. The reasoner may find the best mapping between the generic configurations and the selected configuration, wherein "the best" may be predefined according to related parameters. Once this step may have been done, the attributes and preference parameters from the resources of the generic configuration may also be used for the selected configuration and the related resources.

Furthermore, the method 100 may also comprise validating, 112, the selected configuration based on ontology rules related to the plurality of resources, and calculating, 114, a satisfaction degree for the validated configuration based on the preference parameter value. The calculation may also be performed by the reasoner. Additionally, the calculating may also be based on the ontology rules.

The so selected configuration may be used as a template for future deployments of IT-services, e.g., a provisioning of a virtual machine, a development platform, a software service or any other service that may be made available from a data center.

Figure 2:
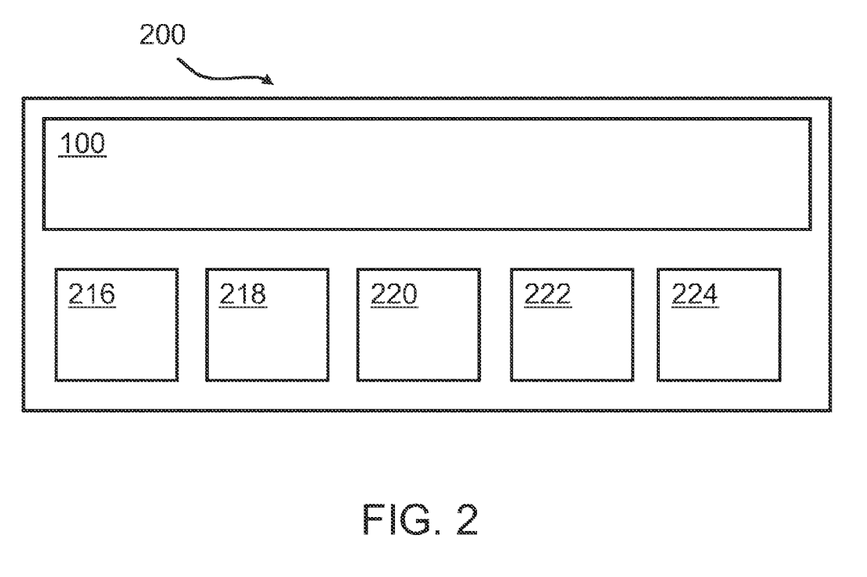
FIG. 2 may illustrate further details of preferred embodiments of the inventive method.

FIG. 2 may show an enhanced embodiment with various additional steps of the method. Block 216 may represent a selecting a second combination of resources forming a second selected configuration that may be compared to the initial configuration, as described above.

Block 218 may represent selecting the selected configuration having the highest satisfaction degree. Block 220 may represent providing a view of a plurality of resources in a user interface, whereas block 222 may represent providing a selection tool for selecting the resource that may be seen as appropriate for a configuration.

Block 224 may be seen as a feature of providing a view of the at least one preference parameter and providing a user interface for receiving the respective preference parameter value.

Figure 3:
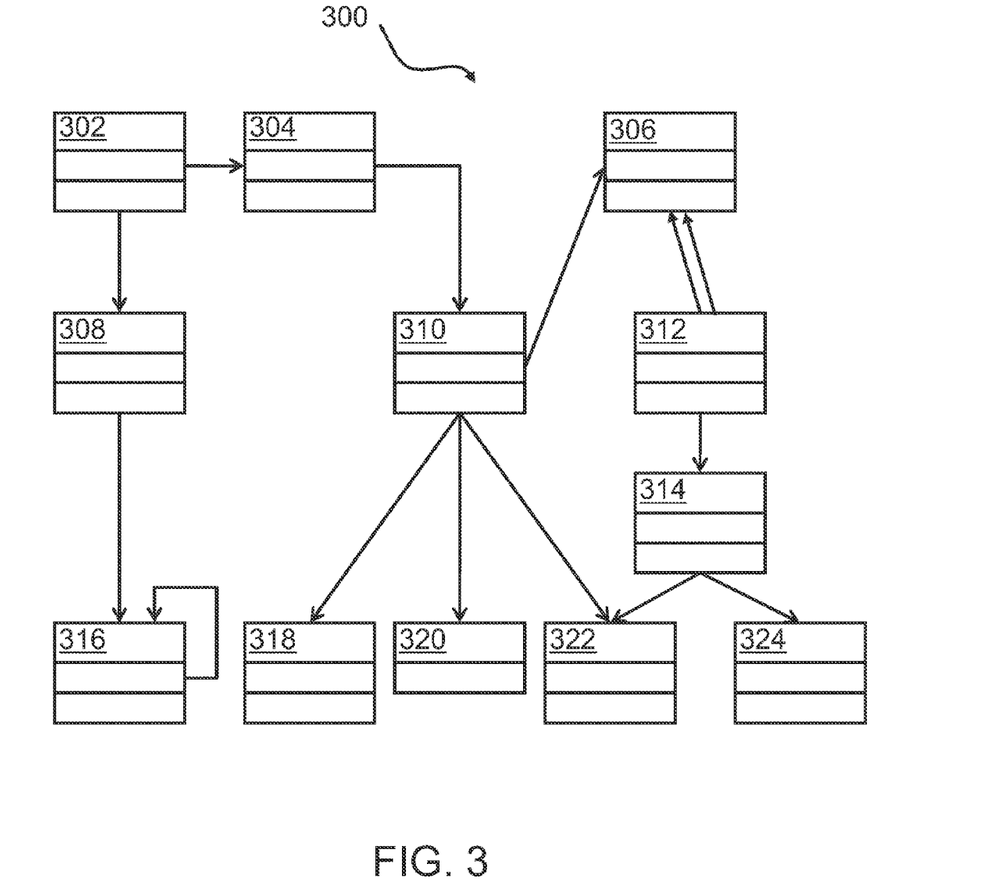
FIG. 3 may illustrate an embodiment of a generic service ontology.

FIG. 3 may be an illustration of an exemplary service ontology. A service 302 may substantiate a utility evaluation 304. The utility evaluation 304 may define a preference parameter pair 310. The preference parameter pair 310 may have an attribute 318. The preference parameter pair 310 may have a weight 320. It may be given in "xsd:float". The preference parameter pair 310 may also have a preference parameter 322.

Furthermore, the service 302 may have a configuration 308. The configuration 308 may consist of a resource 316. A resource 316 may relate to another resource 316. This may be illustrated by the self-referring arrow.

The preference parameter pair 310 may be evaluated by a function 306. It may inherit its' characteristics to a point-based function 312, such that the point-based function 312 may represent a sub-class of the function 306. The point-based function 312 may be constituted by at least one point 314. The point 314 may refer to the preference parameter 322. The point 314 may also have a value 324 of the form "xsd:float". Thus, the point 314 may link the preference parameter 322 to a related preference parameter value 324.

Figure 4:
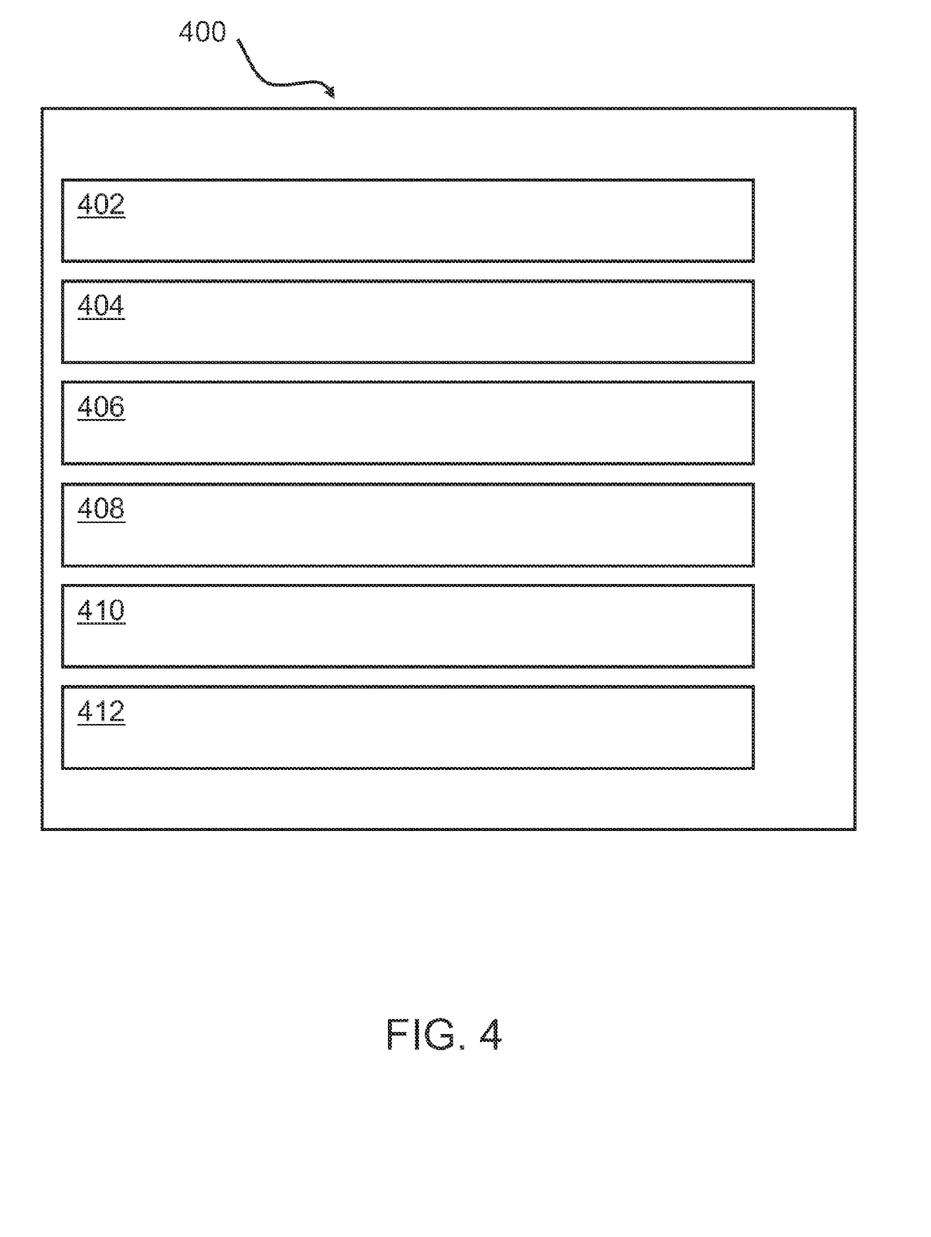
FIG. 4 may illustrate an embodiment of the inventive service evaluation engine.

FIG. 4 may illustrate an exemplary embodiment of a service evaluation engine. The service evaluation engine 400 may comprise an assigning unit 402 adapted for assigning at least one attribute, having at least one preference parameter, to at least one generic configuration, wherein the at least one generic configuration comprises at least one resource, a receiving unit 404 that may be adapted for receiving a request for the service having an assigned quality-of-service-value, and an assigning unit 406. The assigning unit may be adapted for assigning a respective preference parameter value to each of the at least one preference parameters based on the quality-of-service-value. The engine may further comprise a selecting unit 408 that may be adapted for selecting a combination of the resources based on the request. The combination of the resources may form a selected configuration,

- a reasoner (410) that may be adapted for mapping the selected, configuration to one of the at least one of the generic configurations and mapping the at least one preference parameter of the at least one attributes of the mapped at least one of the generic configurations to the selected configuration, wherein the reasoner may also be adapted for validating the selected configuration based on ontology rules related to the plurality of resources, and
- a calculating unit (412), particularly the reasoner, that may be adapted for calculating a satisfaction degree for the validated configuration based on the preference parameter value. The calculation may also be based on the ontology rules.

Figure 6A:
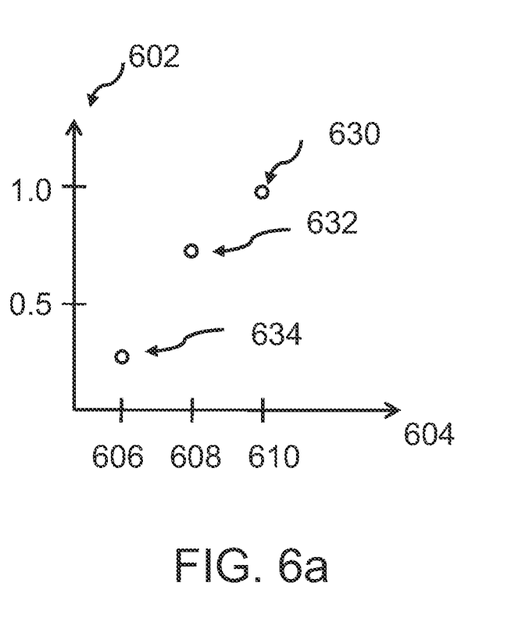
FIG. 6a and FIG. 6b may illustrate diagrams referring to details of an embodiment relating to the calculation of a satisfaction degree.
Figure 6B:
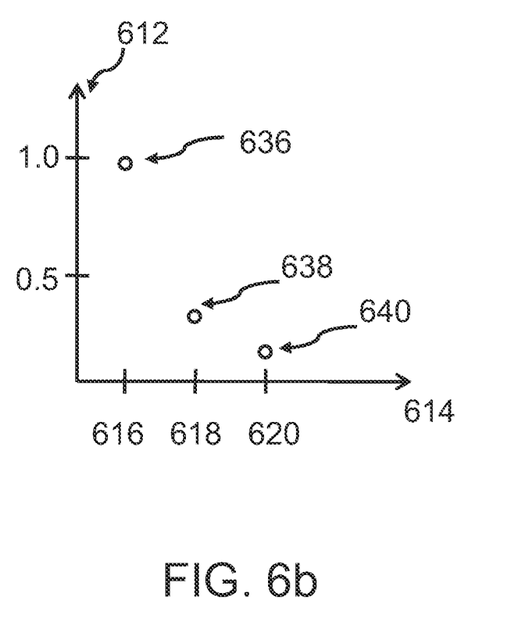

FIGS. 6*a* and 6*b* may illustrate how the reasoner and the calculating unit may work based on attributes, preference parameters, preference parameter values and weights.

For a given generic configuration two attributes may be defined: "performance" and "costs". FIG. 6*a* may relate to the performance attribute. FIG. 6*b* may relate to the cost attribute. The attribute "performance" may have three preference parameters "high", "medium" and "low". More details may be derived from the following table:

|  | attribute | preference parameters | | | weight |
|---|---|---|---|---|---|
| value | performance | high 1.0 | medium 0.75 | low 0.25 | 0.7 |
| value | cost | high 0.15 | medium 0.3 | low 1.0 | 0.3 |

In the case of the table above, the preference parameters for both, performance and cost for a generic configuration may have been chosen to be "high", "medium" and "low". This may only be an example. Alternatively, for the preference parameters "performance", price bands may have been defined, as well as any other combination or form of preference parameters. The same applies to the attribute "cost" and the related preference parameters.

Each individual value of the preference parameters (horizontal row) may not exceed the value of "1". Additionally, the sum of the weights (vertical column) may also not exceed the value of "1". In this case, it may be achieved that a calculated satisfaction degree may not exceed the value of "1". Actually, it may be between 0 and 1. Such a value below or equal "1" may be related to a percentage value between 0 and 100%.

In the step of mapping a selected configuration to a generic configuration, the reasoner may decide for a best match of a preference parameter and thus, a preference parameter value. As a result of the mapping a selected configuration may be linked to just one of the potential preference parameters and a related value.

It may be assumed that a mapping may result in the feet that a selected configuration may have the preference parameter "performance"=high. Additionally, the preference parameter "cost" may show the best match for the preference parameter value "medium".

A transformation from the charts of FIGS. 6*a* and 6*b* together with the table above may results in: Overall satisfaction degree=performance weight "times" performance preference parameter value+cost weight "times" performance preference cost value.

Thus, Overall-Satisfaction-Degree=0.7*1.0+ 0.3*0.3=0.79.

In this context, the reference numerals in FIGS. 6*a* and 6*b* may be as follows:

- 602=preference parameter value for "performance"
- 604=different preference parameters for "performance"
- 606=low
- 608=medium
- 610=high
- 612=preference parameter value for "cost"
- 614=different preference parameters for "cost"
- 616=low
- 618=medium
- 620=high
- 630=assigned preference parameter value for "performance" "low"
- 632=assigned preference parameter value for "performance" "medium"
- 634=assigned, preference parameter value for "performance" "high"
- 636=assigned preference parameter value for "cost" "low"
- 638=assigned preference parameter value for "cost" "medium"
- 640=assigned preference parameter value for "cost" "high"

Figure 5:
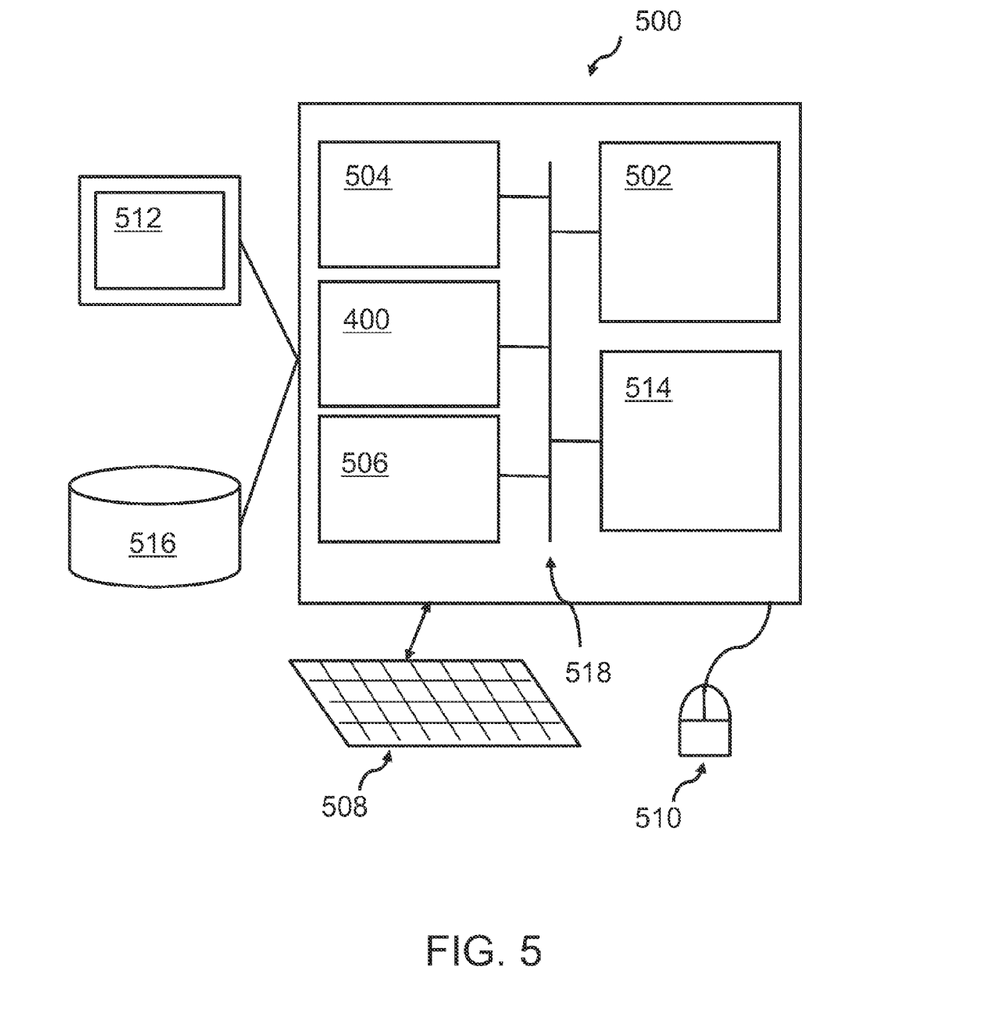
FIG. 5 may illustrate schematically an embodiment of a computer system comprising the inventive service evaluation engine.

Embodiments of the invention may partly be implemented on virtually any type of computer, regardless of the platform being used suitable for storing and/or executing program code. For example, as shown in FIG. 5, a computer system 500 may include one or more processor(s) 502 with one or more cores per processor, associated memory elements 504, an internal storage device 506 (e.g., a hard disk, an optical drive such as a compact disk drive or digital video disk (DVD) drive, a flash memory stick, etc.), and numerous other elements and functionalities typical of today's computers (not shown). The memory elements 504 may include a main memory, employed during actual execution of the program code, and a cache memory, which provides temporary storage for at least some program code or data in order to reduce the number of times, code must be retrieved, from external bulk storage 516 for execution. Elements inside the computer 500 may be linked together by means of a bus system 518 with corresponding adapters. Additionally, a service evaluation engine 400 may be connected to the bus 518.

The computer system 500 may also include input means, such as a keyboard 508, a mouse 510, or a microphone (not shown). Furthermore, the computer 500 may include output means, such as a monitor 512 [e.g., a liquid crystal display (LCD), a plasma display, a light emitting diode display (LED), or a cathode ray tube (CRT) monitor]. The computer system 500 may be connected to a network (e.g., a local area network (LAN), a wide area network (WAN), such as the Internet, or any other similar type of network, including wireless networks via a network interface connection 514. This may allow a coupling to other computer systems. Those, skilled in the art will appreciate that many different types of computer systems exist, and the aforementioned input and output means may take other forms. Generally speaking, the computer system 500 may include at least the minimal processing, input and/or output means, necessary to practice embodiments of the invention.

Further, those skilled in the art will appreciate that one or more elements of the aforementioned, computer system 500 may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources or a smartphone.

Further, software instructions to perform embodiments of the invention may be stored on a computer readable medium, such as a compact disk (CD), a diskette, a tape, or any other computer readable storage device.

While the invention has been described with respect to a limited number of embodiments, those skilled in the art, benefitting from this disclosure, will appreciate that other embodiments may be devised, which do not depart from the scope of the invention as disclosed herein. Accordingly, the scope of the invention should be limited only by the attached claims.

It should also be noted that the term "comprising" does not exclude other elements or steps and "a" or "an" does not exclude a plurality. Also, elements described, in association with different embodiments may be combined. It should also be noted that reference signs in the claims should not be construed as limiting elements.

The invention claimed is:

1. A method, in a data processing system, for evaluating a service based on a request for the service, the method comprising:
   for each generic configuration in at least one generic configuration, assigning, by a processor in the data processing system, at least one attribute, having at least one preference parameter, wherein each generic configuration of the at least one generic configuration comprises at least one resource,
   receiving, by processor, a request for the service having an assigned quality-of-service-value,
   assigning, by the processor, a respective preference parameter value to each preference parameter of the at least one preference parameter based on the quality-of-service-value,
   selecting, by the processor, at least two different combinations of resources based on the request, wherein the at least two different combinations of resources form at least two different selected configurations, and
   for each selected configuration of the at least two different selected configurations;
      mapping, by the processor, the selected configuration to one generic configuration of the at least one of the generic configuration and mapping, by the processor, the at least one preference parameter of the at least one attribute of the mapped one generic configuration to the selected configuration,
      validating, by the processor, the selected configuration based on ontology rules related to the at least one resource comprised within the mapped one generic configurations, and
      responsive to the selected configuration being validated thereby forming a validated configuration, calculating, by the processor, a satisfaction degree for the validated configuration based on the preference parameter value assigned to each of the at least one preference parameter associated with the one generic configuration mapped to the validated configuration.

2. The method of claim 1, wherein the calculation of the satisfaction degree comprises:
   selecting, by the processor, the selected configuration having the highest satisfaction degree.

3. The method of claim 1, wherein the selecting the combination of resources comprises:
   providing, by the processor, a view of the plurality of resources in a user interface, and
   providing, by the processor a selection tool for selecting the resources.

4. The method of claim 1, wherein the assigning the respective preference parameter value comprises:
   providing, by the processor, a view of the at least one preference parameter, and
   providing, by the processor, a user interface for receiving the respective preference parameter value.

5. The method of claim 1, wherein the configuration is described in two ontology layers, one of the ontology layers being a generic service ontology.

6. The method of claim 5, wherein the two ontology layers are based on the Web Ontology Language.

7. The method of claim 1, wherein the ontology rules are based on the Semantic Web Rule Language.

8. The method of claim 1, wherein the calculating of the satisfaction degree is based on a weighted aggregation of all attributes.

* * * * *